(12) United States Patent
Kitatani et al.

(10) Patent No.: US 12,090,793 B2
(45) Date of Patent: Sep. 17, 2024

(54) TIRE

(71) Applicant: Sumitomo Rubber Industries, Ltd., Hyogo (JP)

(72) Inventors: Tsukasa Kitatani, Kobe (JP); Kozo Yoshimura, Kobe (JP); Ryota Ikeda, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 11 days.

(21) Appl. No.: 17/705,467

(22) Filed: Mar. 28, 2022

(65) Prior Publication Data

US 2022/0339965 A1 Oct. 27, 2022

(30) Foreign Application Priority Data

Apr. 21, 2021 (JP) ................................. 2021-072103
May 10, 2021 (JP) ................................. 2021-079950

(51) Int. Cl.
*B60C 11/03* (2006.01)
*B60C 11/01* (2006.01)
(Continued)

(52) U.S. Cl.
CPC .......... *B60C 11/0304* (2013.01); *B60C 11/01* (2013.01); *B60C 11/0302* (2013.01);
(Continued)

(58) Field of Classification Search
CPC ............. B60C 11/0304; B60C 11/0302; B60C 11/1236; B60C 11/125; B60C 11/1263; B60C 11/1392
See application file for complete search history.

(56) References Cited

U.S. PATENT DOCUMENTS 2,094,636 A 10/1937 Bull
2010/0200134 A1* 8/2010 Murata ............... B60C 11/0304
152/209.8
(Continued)

FOREIGN PATENT DOCUMENTS

EP 0355636 A2 * 2/1990
EP 2 990 231 A1 3/2016
(Continued)

OTHER PUBLICATIONS

Ota, English Machine Translation of JP H0253609 A, 1990 (Year: 1990).*
(Continued)

*Primary Examiner* — Justin R Fischer
*Assistant Examiner* — Brendon Charles Darby
(74) *Attorney, Agent, or Firm* — Studebaker & Brackett PC

(57) ABSTRACT

A tire includes a tread portion including first and second tread edges, three or more circumferential grooves, and four or more land portions. The circumferential grooves include a first shoulder circumferential groove nearest to the first tread edge. Each land portion is provided with only sipes and is not provided with lateral grooves. The land portions include a first shoulder land portion having the first tread edge, and a first middle land portion adjacent to the first shoulder land portion. The first middle land portion is provided with first middle sipes traversing the first middle land portion completely in the tire axial direction. The first shoulder land portion is provided with first shoulder sipes extending from the first shoulder circumferential groove to the first tread edge. The first shoulder sipes have a circumferential pitch length smaller than a circumferential pitch length of the first middle sipes.

20 Claims, 13 Drawing Sheets

(51) Int. Cl.
  *B60C 11/12*    (2006.01)
  *B60C 11/13*    (2006.01)

(52) U.S. Cl.
  CPC ........ *B60C 11/1236* (2013.01); *B60C 11/125* (2013.01); *B60C 11/1263* (2013.01); *B60C 11/1281* (2013.01); *B60C 11/1307* (2013.01); *B60C 11/1353* (2013.01); *B60C 2011/0341* (2013.01); *B60C 2011/0376* (2013.01); *B60C 2011/0388* (2013.01)

(56) References Cited

U.S. PATENT DOCUMENTS

| | | | |
|---|---|---|---|
| 2013/0092304 A1 | 4/2013 | Murata | |
| 2013/0192731 A1* | 8/2013 | Oji | B60C 11/0306 152/209.8 |
| 2016/0075188 A1* | 3/2016 | Sakiyama | B60C 11/04 152/209.1 |
| 2017/0100965 A1* | 4/2017 | Kikuchi | B60C 11/1263 |
| 2017/0253086 A1* | 9/2017 | Sanae | B60C 11/0304 |
| 2018/0009269 A1* | 1/2018 | Kawagoe | B60C 11/1236 |
| 2018/0170114 A1* | 6/2018 | Hayashi | B60C 11/12 |
| 2019/0105950 A1* | 4/2019 | Tanaka | B60C 11/1204 |
| 2021/0107318 A1* | 4/2021 | Speziari | B60C 11/033 |

FOREIGN PATENT DOCUMENTS

| | | | | |
|---|---|---|---|---|
| JP | H0253609 | A * | 2/1990 | |
| JP | 2005280455 | A * | 10/2005 | |
| JP | 2012-017001 | A | 1/2012 | |
| JP | 2012179965 | A * | 9/2012 | ............ B60C 11/03 |
| JP | 2018-158730 | A | 10/2018 | |
| WO | 2012/032144 | A1 | 3/2012 | |
| WO | 2016/109724 | A1 | 7/2016 | |

OTHER PUBLICATIONS

Iwai, English Machine Translation of JP 2012179965, 2012 (Year: 2012).*
Hino, English Machine Translation of JP 2005280455, 2015 (Year: 2015).*
The extended European search report issued by the European Patent Office on Sep. 12, 2022, which corresponds to European Patent Application No. 22167150.6-1012 and is related to U.S. Appl. No. 17/705,467.

* cited by examiner

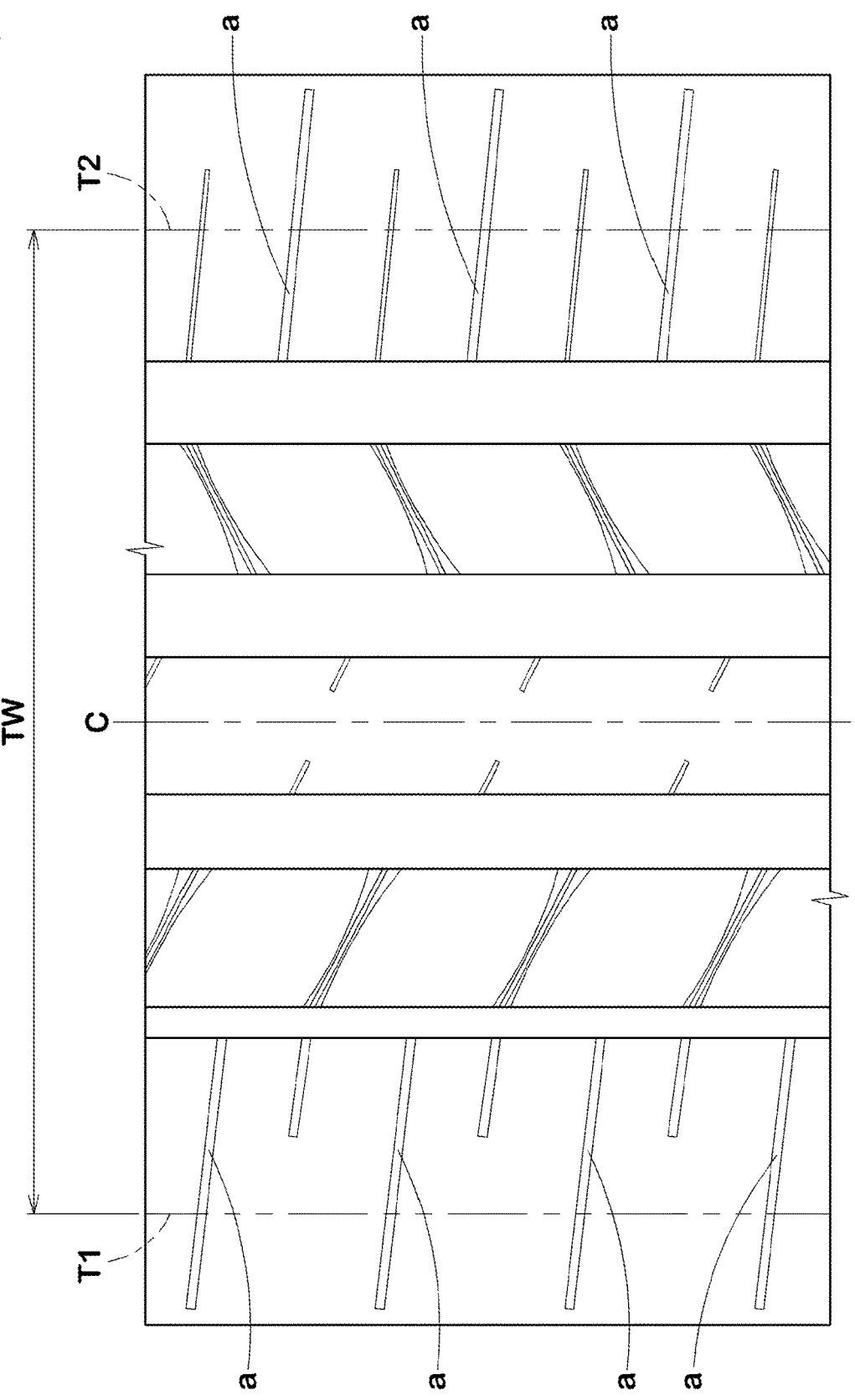
FIG.15 Reference Example

TIRE

RELATED APPLICATIONS

This application claims the benefit of foreign priorities to Japanese Patent Applications No. JP2021-072103, filed Apr. 21, 2021, and No. JP2021-079950, filed May 10, 2021, which are incorporated by reference in its entirety.

FIELD OF THE INVENTION

The present disclosure relates to a tire.

BACKGROUND OF THE INVENTION

Patent document 1 below discloses a pneumatic tire with an inboard middle land portion and an outboard middle land portion each of which is provided with a plurality of middle lateral sipes. The pneumatic tire has been expected an improvement of steering stability and noise performance by adjusting a pitch length of the middle lateral sipes.

PATENT DOCUMENT

[Patent document 1] Japanese Unexamined Patent Application Publication No. 2018-158730

SUMMARY OF THE INVENTION

In recent years, vehicles have become quieter. With this, tires have also been required to have further improvement in noise performance.

The present disclosure has been made in view of the above circumstances and has a major object to provide a tire capable of improving noise performance while ensuring excellent wet performance.

In one aspect of the present disclosure, a tire includes a tread portion including a first tread edge, a second tread edge, three or more circumferential grooves extending continuously in a tire circumferential direction between the first and second tread edges, and four or more land portions divided by the circumferential grooves. The circumferential grooves include a first shoulder circumferential groove located nearest to the first tread edge in the circumferential grooves. Each of the land portions is provided with only sipes and is not provided with lateral grooves. The land portions include a first shoulder land portion having the first tread edge, and a first middle land portion adjacent to the first shoulder land portion via the first shoulder circumferential groove. The first middle land portion is provided with a plurality of first middle sipes traversing the first middle land portion completely in a tire axial direction. The first shoulder land portion is provided with a plurality of first shoulder sipes extending from the first shoulder circumferential groove to the first tread edge. The plurality of first shoulder sipes has a pitch length in the tire circumferential direction smaller than a pitch length in the tire circumferential direction of the plurality of first middle sipes.

BRIEF DESCRIPTION OF THE DRAWINGS

FIG. 15 is a development view of a tread portion of a tire in accordance with a reference example.

DETAILED DESCRIPTION OF THE INVENTION

Figure 1:
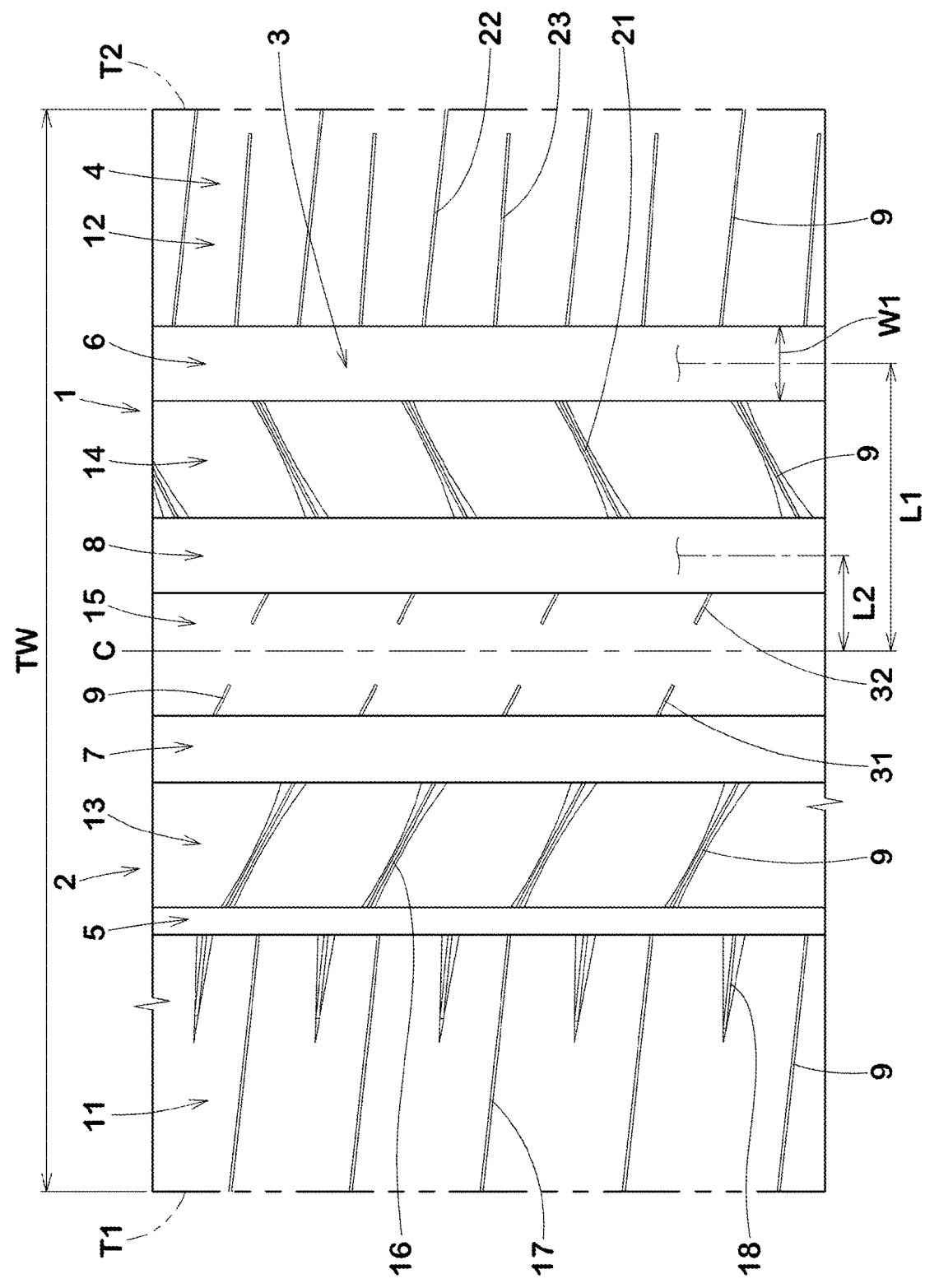
FIG. 1 is a development view of a tread portion in accordance with an embodiment of the present disclosure.

Hereinafter, one or more embodiments of the present disclosure will be described with reference to the drawings. FIG. 1 is a development view of a tread portion 2 of a tire 1 in accordance with an embodiment of the present disclosure. The tire 1 according to the present embodiment is preferably embodied as a pneumatic tire for passenger car. However, the present disclosure is not limited to such an aspect. The present disclosure may be applied to a heavy-duty tire and a non-pneumatic tire in which the inside of the tire is not filled with pressurized air.

As illustrated in FIG. 1, the tread portion 2 according to the present embodiment includes a first tread edge T1, a second tread edge T2, and three or more circumferential grooves 3 extending continuously in the tire circumferential direction between the first tread edge t1 and the second tread edge T2, and four or more land portions 4 divided by the circumferential grooves 3. In the present embodiment, the tread portion 2 is provided with only four circumferential grooves 3 that divides the tread portion 2 into five land portions 4. However, the present disclosure is not limited to such an aspect.

In the present embodiment, the tread portion 2, for example, has a designated mounting direction to a vehicle, where the first tread edge T1 is intended to be located outside a vehicle when the tire is mounted to the vehicle. Thus, the second tread edge T2 is intended to be located inside a vehicle when the tire is mounted to the vehicle. The mounting direction to a vehicle is indicated by letters or symbols on sidewall portions (not illustrated), for example. Note that the tire 1 according to the present disclosure is not limited to such an aspect, and may be configured as a tire in which the mounting direction to a vehicle is not specified.

The first tread edge T1 and the second tread edge T2 are the axial outermost edges of the ground contacting patch of the tire 1 which occurs under the condition such that the tire 1 under a normal state is grounded on a plane with a standard tire load at zero camber angles.

As used herein, when a tire is a pneumatic tire based on a standard, the "normal state" is such that the tire 1 is mounted onto a standard wheel rim with a standard pressure but loaded with no tire load. If a tire is not based on the standards, or if a tire is a non-pneumatic tire, the normal state is a standard state of use according to the purpose of use of the tire and means a state of no load. As used herein, unless otherwise noted, dimensions of portions of the tire are values measured under the normal state.

As used herein, the "standard wheel rim" is a wheel rim officially approved for each tire by standards organizations on which the tire is based, wherein the standard wheel rim is the "standard rim" specified in JATMA, the "Design Rim" in TRA, and the "Measuring Rim" in ETRTO, for example.

As used herein, the "standard pressure" is a standard pressure officially approved for each tire by standards organizations on which the tire is based, wherein the standard pressure is the "maximum air pressure" in JATMA, the maximum pressure given in the "Tire Load Limits at Various Cold Inflation Pressures" table in TRA, and the "Inflation Pressure" in ETRTO, for example.

As used herein, when a tire is a pneumatic tire based on a standard, the "standard tire load" is a tire load officially approved for each tire by the standards organization in which the tire is based, wherein the standard tire load is the "maximum load capacity" in JATMA, the maximum value given in the above-mentioned table in TRA, and the "Load Capacity" in ETRTO, for example. If a tire is not based on the standards, or it a tire is a non-pneumatic tire, the "standard tire load" refers to the load acting on the tire when the tire is under a standard mounted condition. The "standard mounted condition" is such that the tire is mounted to a standard vehicle according to the purpose of use of the tire, and the vehicle is stationary on a flat road surface while being able to run.

The circumferential grooves 3 include a first shoulder circumferential groove 5 located nearest to the first tread edge T1 in the circumferential grooves 3. Further, in the present embodiment, the circumferential grooves 3 include a second shoulder circumferential groove 6, a first crown circumferential groove 7 and the second crown circumferential groove 8. The second shoulder circumferential groove 6 is located nearest to the second tread edge T2 in the circumferential grooves 3. The first crown circumferential groove 7 is disposed between the first shoulder circumferential groove 5 and the tire equator C. The second crown circumferential groove 8 is disposed between the second shoulder circumferential groove 6 and the tire equator C.

A distance L1 in the tire axial direction from the tire equator C to a groove centerline of the first shoulder circumferential groove 5 or a groove centerline of the second shoulder circumferential groove 6, for example, is in a range of from 20% to 30% of the tread width TW. A distance L2 in the tire axial direction from the tire equator C to a groove centerline of the first crown circumferential groove 7 or a groove centerline of the second crown circumferential groove 8, for example, is in a range of from 5% to 15% of the tread width TW. Note that the tread width TW is a distance in the tire axial direction from the first tread edge T1 to the second tread edge T2 under the normal state.

In the present embodiment, the circumferential grooves 3, for example, extend straight parallel to the tire circumferential direction. The circumferential grooves 3, for example, may extend in a wavy manner.

In the present embodiment, the circumferential grooves 3 have groove widths W1 equal to or more than 3.0 mm. The groove widths W1 of the circumferential grooves 3, for example, are in a range from 2.0% to 8.0% of the tread width TW. In the present embodiment, the first shoulder circumferential groove 5 has the smallest groove width in the circumferential grooves 3. As a result, a total groove width of the circumferential grooves 3 provided between the tire equator C and the first tread edge T1 is smaller than a total groove width of the circumferential grooves 3 provided between the tire equator C and the second tread edge T2. However, the present disclosure is not limited to such an aspect. A depth of the circumferential grooves 3, for example, is in a range from 5 to 10 mm for a pneumatic tire for passenger car.

Figure 2:
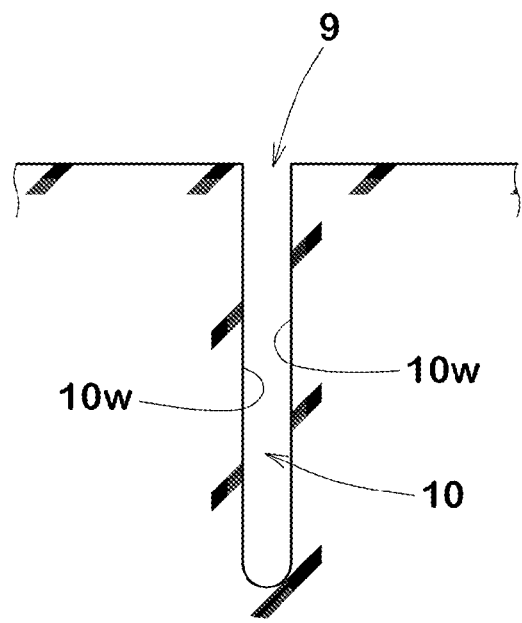
FIG. 2 is a cross-sectional view of a sipe.
Figure 3:
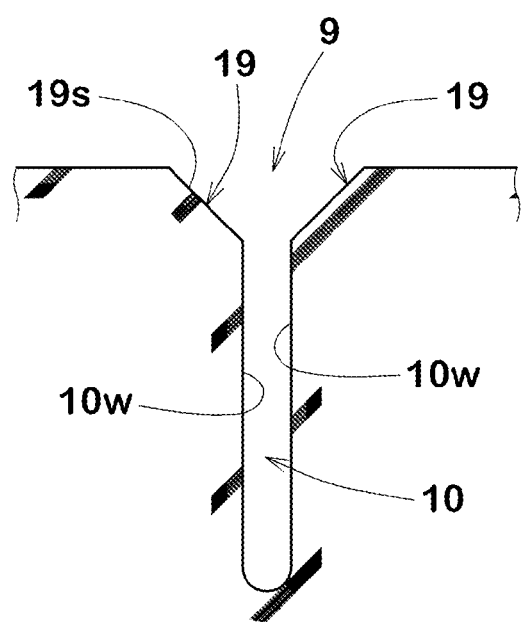
FIG. 3 is a cross-sectional view of a sipe.

Each of the land portions 4 is provided with only sipes 9, and is not provided with lateral grooves. FIG. 2 and FIG. 3 illustrate cross-sectional views of sipes 9. As illustrated in FIG. 2 and FIG. 3, "sipe" is an incision having a small width. The sipe has a main portion 10 including two wall surfaces 10w facing substantially parallel, in which the width between the two wall surfaces 10w is equal to or less than 1.5 mm. A width of sipe is preferably in a range from 0.5 to 1.5 mm. As illustrated in FIG. 2, the sipe 9 may extend from an opening on the tread portion 2 to the bottom with a constant width. Hereinafter, in the present specification, a sipe having such a cross section is referred to as a "non-chamfered sipe". Alternatively, as illustrated in FIG. 3, the sipe 9 may have a pair of sipe edges each or both having a chamfer portion 19. Hereinafter, in the present specification, a sipe having such a cross section is referred to as a "chamfered sipe". The chamfer portion 19 is configured as an inclined surface 19s connected to the outer surface of the tread portion 2 with the adjacent wall surface 10w. The opening width of the chamfered sipe may exceed 1.5 mm. In addition, the bottom of the sipe may be connected to a flask-bottom having a width greater than 1.5 mm.

In addition, the above-mentioned "lateral groove" means a void that can secure a water movement path without closing even when a ground contact load is applied to the tread portion 2. Specifically, the lateral groove means a void that has a distance between a pair of groove walls greater than 1.5 mm. The distance between the pair of groove walls shall be measured at the center position in a groove depth direction.

As illustrated in FIG. 1, the land portions 4 according to the present embodiment include a first shoulder land portion 11 having the first tread edge T1, and a first middle land portion 13 adjacent to the first shoulder land portion 11 via the first shoulder circumferential groove 5. Further, the land portions 4 according to the present embodiment include a second shoulder land portion 12, a second middle land portion 14 and a crown land portion 15. The second shoulder land portion 12 has the second tread edge T2. The second middle land portion 14 is adjacent to the second shoulder land portion 12 via the second shoulder circumferential groove 6. The crown land portion 15 is disposed between the first crown circumferential groove 7 and the second crown circumferential groove 8.

Figure 4:
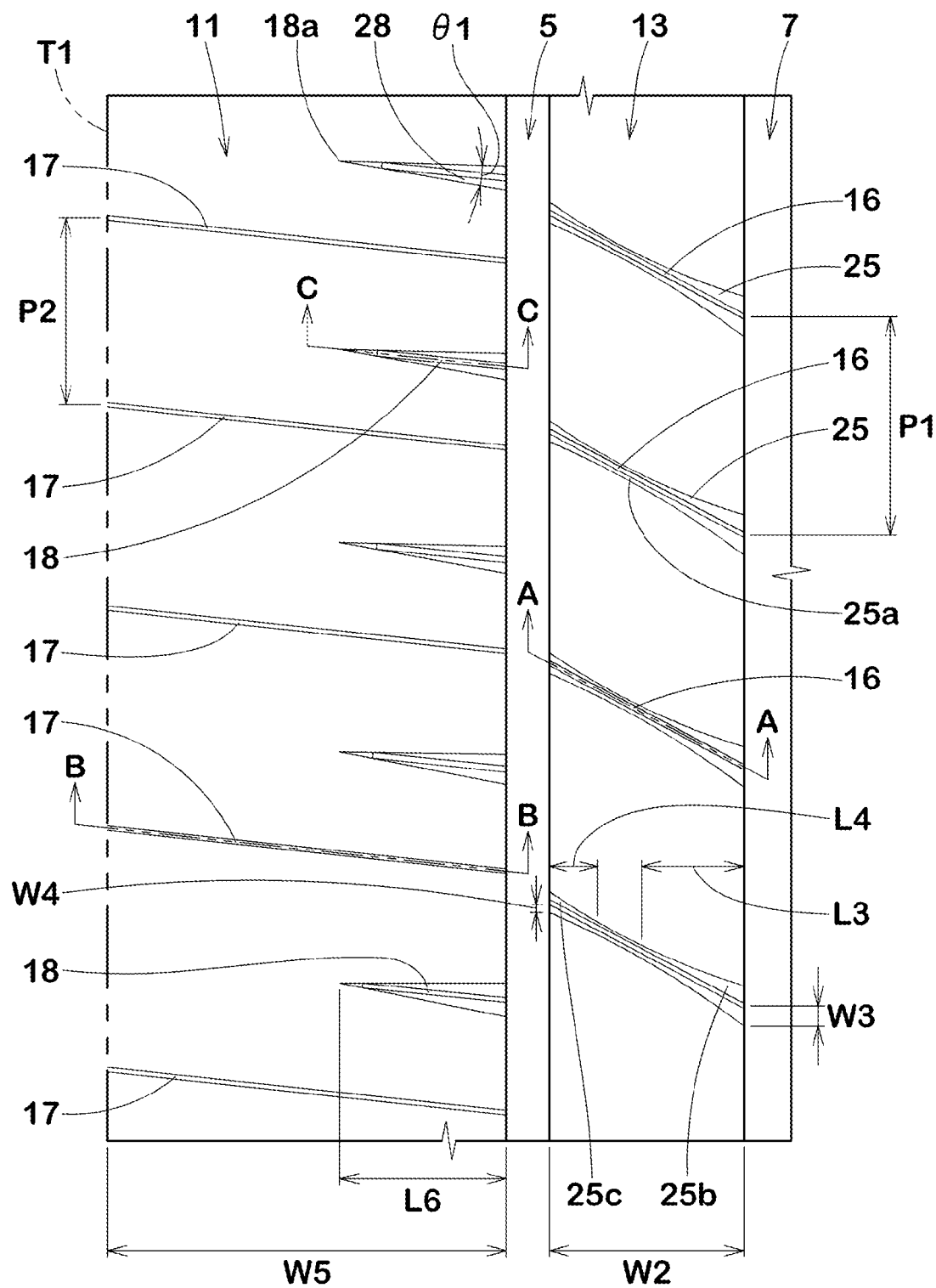
FIG. 4 is an enlarged view of a first shoulder land portion and a first middle land portion of FIG. 1.

FIG. 4 illustrates an enlarged view of the first shoulder land portion 11 and the first middle land portion 13. As illustrated in FIG. 4, the first middle land portion 13 is provided with a plurality of first middle sipes 16 which traverses the first middle land portion 13 completely in the tire axial direction. The first shoulder land portion 11 is provided with a plurality of first shoulder sipes 17 extending from the first shoulder circumferential groove 5 to the first tread edge T1 at least. In the present disclosure, a pitch length P2 in the tire circumferential direction of the plurality of first shoulder sipes 17 is smaller than a pitch length P1 in the tire circumferential direction of the plurality of first middle sipes 16. The present disclosure can improve noise performance while ensuring excellent wet performance adopting the above configuration. The reason is presumed as follows.

Since the tire 1 according to the present disclosure include three or more circumferential grooves 3, excellent wet performance can be maintained. Further, since the four or more land portions 4 are not provided with any lateral grooves, no pumping noise is generated due to the lateral groove, and noise performance can be improved. Furthermore, since the tire 1 according to the present disclosure does not have any lateral grooves in each of the land portions 4, the rolling resistance can further be reduced.

In addition, since the pitch length P2 of the first shoulder sipes 17 is smaller than the pitch length P1 of the first middle sipes 16, the circumferential rigidity of the first shoulder land portion 11 can be mitigated, reducing impact noise when grounding. In particular, since the first shoulder land portion 11 does not have any lateral grooves nor blocks separated by lateral grooves, the first shoulder land portion 11 hardly vibrate when the first shoulder land portion 11 leaves the ground. Therefore, the present disclosure can reliably reduce noise generated by the first shoulder land portion 11.

Hereinafter, a more detailed configuration of the present embodiment will be described. Note that each configuration described below shows a specific aspect of the present embodiment. Thus, the present disclosure can exert the above-mentioned effects even if the tire does not include the configuration described below. Further, if any one of the configurations described below is applied independently to the tire of the present disclosure having the above-mentioned characteristics, the performance improvement according to each additional configuration can be expected. Furthermore, when some of the configurations described below are applied in combination, it is expected that the performance of the additional configurations will be improved.

In the present embodiment, a pitch length P2 of two adjacent first shoulder sipes 17 arbitrarily selected from the plurality of first shoulder sipes 17 is smaller than a pitch length P1 of two adjacent first middle sipes 16 which are adjacent to the two adjacent first shoulder sipes 17 in the tire axial direction. In some preferred embodiments, an average of the pitch lengths P2 of the first shoulder sipes 17 is smaller than an average of the pitch lengths P1 of the first middle sipes 16. The arrangement of such sipes can improve noise performance more reliably.

In view of an improvement of wet performance and noise performance in a well-balanced manner, a pitch length P2 of two adjacent first shoulder sipes 17, for example, is in a range of from 60% to 90% of a pitch length P1 of two adjacent first middle sipes 16, preferably in a range of from 70% to 85%. Further, a pitch length P1 of two adjacent first middle sipes 16, for example, is in a range of from 100% to 130% of a width W2 in the tire axial direction of a ground contact surface of the first middle land portion 13.

The first middle sipes 16, for example, are inclined in a first direction (down toward the right, in this embodiment) with respect to the tire axial direction. In some preferred embodiments, an angle with respect to the first middle sipes 16, for example, is in a range of from 20 to 40 degrees. Such first middle sipes 16 can provide frictional force in the tire axial direction during wet driving.

The first middle sipes 16, for example, are configured as chamfered sipes as shown in FIG. 3. Each chamfer portion 25 of the first middle sipes 16, for example, includes a constant width portion 25a, an inner widening portion 25b and an outer widening portion 25c. The constant width portion 25a extends in a sipe-length direction with a constant chamfer width. The inner widening portion 25b, for example, is connected to the constant width portion 25a on the first crown circumferential groove 7 side, and has a chamfer width increasing from the constant width portion 25a to the first crown circumferential groove 7. The outer widening portion 25c, for example, is connected to the constant width portion 25a on the first shoulder circumferential groove 5 side, and has a chamfer width increasing from the constant width portion 25a to the first shoulder circumferential groove 5. The first middle sipes 16 having such a chamfered portion 25 can reduce impact noise when the first middle land portion 13 comes into contact with the ground, further improving noise performance.

The axial center of the constant width portion 25a, for example, is offset to a first tread edge T1 side from the center in the tire axial direction of the first middle land portion 13. Thus, a length L3 in the tire axial direction of the inner widening portion 25b is greater than a length L4 in the tire axial direction of the outer widening portion 25c. Preferably, the length L3 of the inner widening portion 25b is in a range of from 40% to 60% of the width W2 of the ground contact surface of the first middle land portion 13. Preferably, the length L4 of the outer widening portion 25c is in a range of from 25% to 35% of the width W2 of the ground contact surface of the first middle land portion 13. With this, a large chamfered portion can be formed on the tire equator C side of the first middle land portion 13, and noise performance can further be improved.

From the same point of view, the maximum chamfer width W3 of the inner widening portion 25b is preferably greater than the maximum chamfer width W4 of the outer widening portion 25c. Preferably, the maximum chamfer width W3 of the inner widening portion 25b is in a range of from 1.3 to 2.0 times the maximum chamfer width W4 of the outer widening portion 25c.

Figure 5:
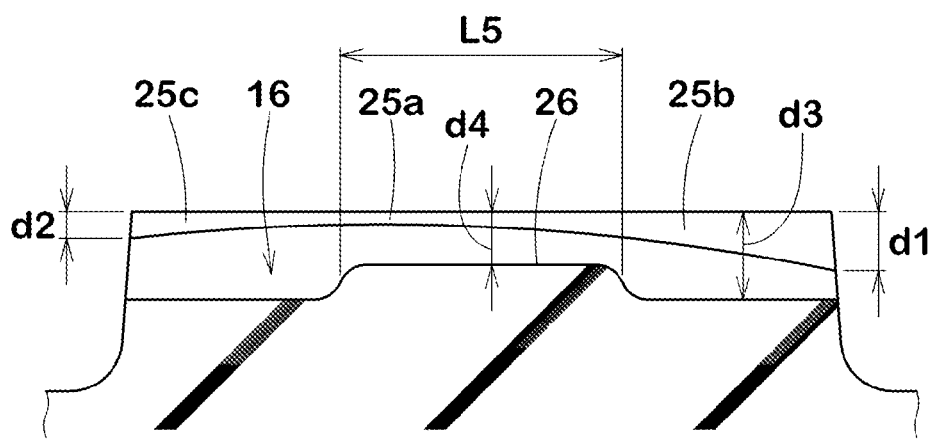
FIG. 5 is a cross-sectional view taken along the line A-A of FIG. 4.

FIG. 5 illustrates a cross-sectional view taken along the line A-A of FIG. 4. As illustrated in FIG. 5, the maximum chamfer depth d1 of the inner widening portion 25b is preferably greater than the maximum chamfer depth d2 of the outer widening portion 25c. Preferably, the maximum chamfer depth d1 of the inner widening portion 25b is in a range of from 1.5 to 2.5 times the maximum chamfer depth d2 of the outer widening portion 25c.

One or more first middle sipes 16, for example, are provided with a first middle tie-bar 26 in which a groove bottom thereof is raised locally. The first middle tie-bar 26, for example, when the first middle sipe 16 is divided into three equal regions in the tire axial direction, is located in the middle region of the three regions. The first middle tie-bar 26 has a length L5 in the tire axial direction in a range of from 30% to 50% of the width W2 (shown in FIG. 4) in the tire axial direction of the ground contact surface of the first middle land portion 13. If a length in the tire axial direction of the first middle tie-bar changes in the tire radial direction, the length shall be measured at the center position of the tie-bar in the tire radial direction. Preferably, a depth d4 from the ground contact surface of the first middle land portion 13 to an outer surface of the first middle tie-bar 26 is in a range of from 50% to 70% of the maximum depth d3 of the first middle sipe 16. Such a first middle tie-bar 26 can also help to reduce rolling resistance while improving noise performance.

As illustrated in FIG. 4, the first shoulder sipes 17, for example, are configured as non-chamfered sipes as shown in FIG. 2. The first shoulder sipes 17, for example, are inclined at an angle smaller than that of the first middle sipes 16 with respect to the tire axial direction. An angle of the first shoulder sipes 17, for example, is equal to or less than 10 degrees with respect to the tire axial direction. In the present embodiment, the first shoulder sipes 17, for example, are inclined in the first direction with respect to the tire axial direction.

Figure 6:
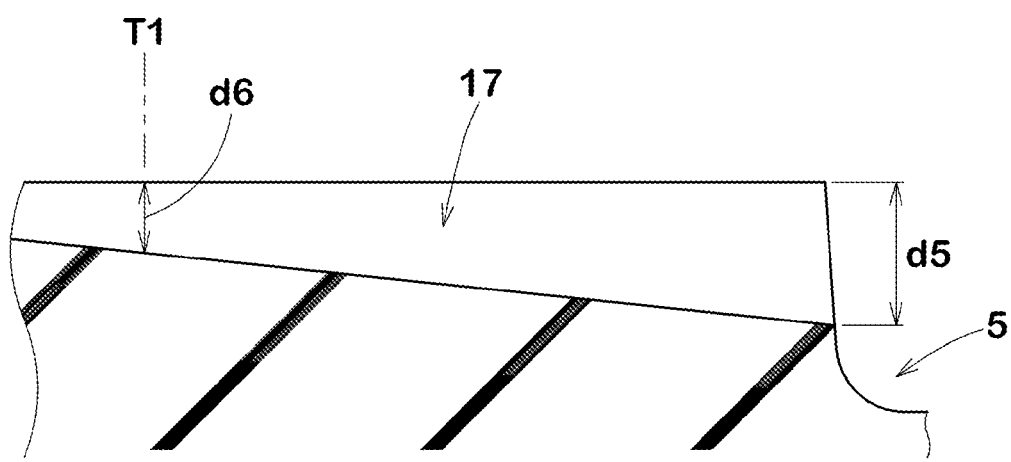
FIG. 6 is a cross-sectional view taken along the line B-B of FIG. 4.

FIG. 6 illustrates a cross-sectional view taken along the line B-B of FIG. 4. As illustrated in FIG. 6, the first shoulder sipes 17 each have a depth decreasing from the first shoulder circumferential groove 5 to the first tread edge T1 side. In the present embodiment, the depth of each first shoulder sipe 17 decreases continuously toward the first tread edge T1. A depth d6 of each first shoulder sipe 17 at the first tread edge T1, for example, is in a range of from 10% to 70% of the maximum depth d5 of the first shoulder sipe 17, preferably in a range of from 20 to 65%. Such a first shoulder sipe 17 can increase the rigidity near the first tread edge T1 to improve steering stability, and can reduce impact noise when the first shoulder land portion 11 comes into contact with the ground.

As illustrated in FIG. 4, the first shoulder land portion 11 is further provided with a plurality of first semi-open sipes 18. The first semi-open sipes 18 extend from the first shoulder circumferential groove 5 and have terminal ends 18a terminating within the first shoulder land portion 11 without reaching the first tread edge T1. In the present embodiment, the first shoulder sipes 17 and the first semi-open sipes 18 are arranged alternately in the tire circumferential direction. Such first semi-open sipes 18 can help to improve wet performance and noise performance in a well-balanced manner.

The first semi-open sipes 18, for example, extend along the first shoulder sipes 17. An angle difference between the first semi-open sipes 18 and the first shoulder sipes 17, for example, is equal to or less than 5 degrees, preferably these extend in parallel with each other. The first semi-open sipes 18 have a length L6 in the tire axial direction in a range of from 30% to 50% of a width W5 in the tire axial direction of the ground contact surface of the first shoulder land portion 11, for example. Such first semi-open sipes 18 can help to improve wet performance and noise performance in a well-balanced manner.

The first semi-open sipes 18, for example, are configured as chamfered sipes as shown in FIG. 3. In some preferred embodiments, a chamfer width of each chamfer portion 28 of each first semi-open sipe 18, for example, increases continuously from the terminal end 18a side toward the first shoulder circumferential groove 5. An angle θ1 between the pair of sipe edges of each first semi-open sipe 18 on the ground contact surface of the first shoulder land portion 11, for example, is in a range of from 5 to 15 degrees. With this, noise performance can further be improved.

Figure 7:
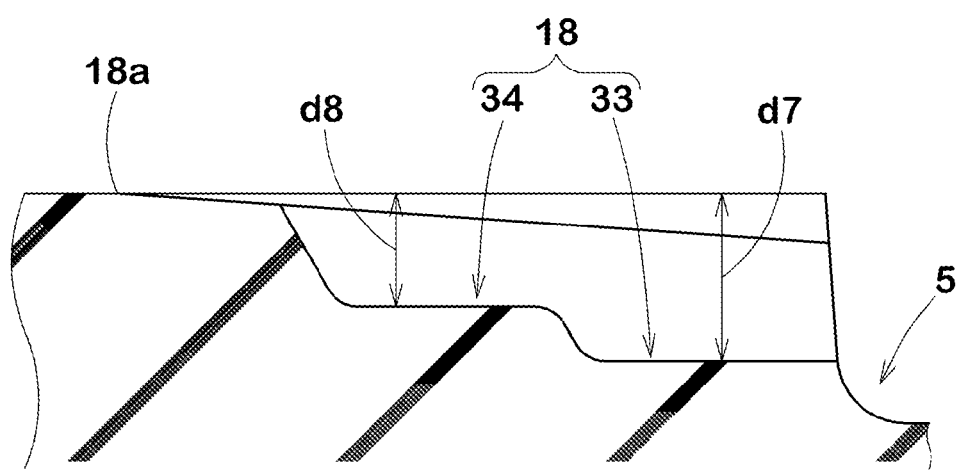
FIG. 7 is a cross-sectional view taken along the line C-C of FIG. 4.

FIG. 7 illustrates a cross-sectional view taken along the line C-C of FIG. 4. As illustrated in FIG. 7, each first semi-open sipe 18 includes a first portion 33 located on a first shoulder circumferential groove 5 side, and a second portion 34 located on the terminal end 18a side and having a smaller depth than that of the first portion 33. A depth d8 of the second portion 34, for example, is in a range of from 60% to 75% of a depth d7 of the first portion 33. Thus, excellent noise performance can be achieved while suppressing rolling resistance.

Figure 8:
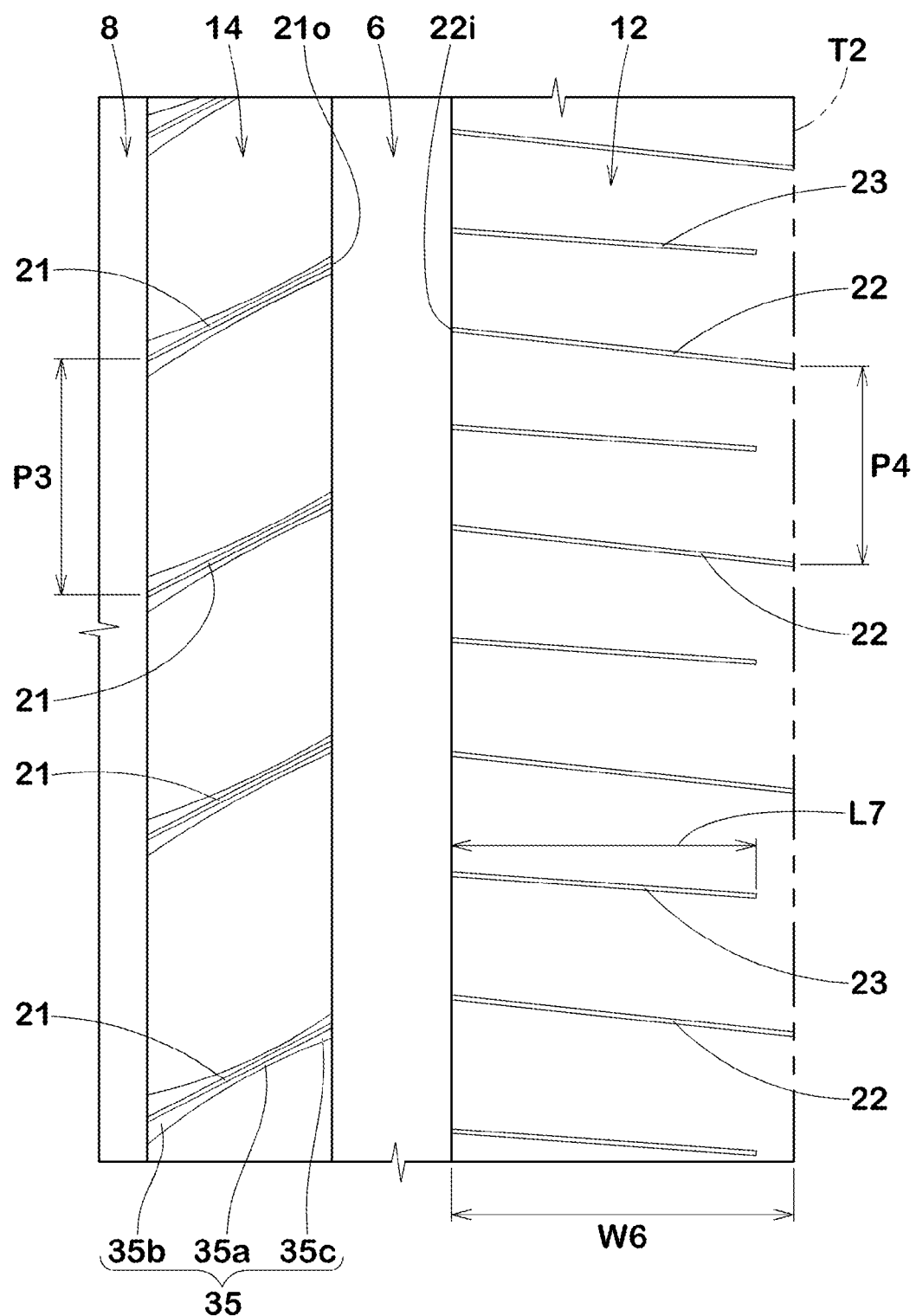
FIG. 8 is an enlarged view of a second middle land portion and a second shoulder land portion.

FIG. 8 illustrates an enlarged view of the second middle land portion 14 and the second shoulder land portion 12. As illustrated in FIG. 8, the second middle land portion 14 is provided with a plurality of second middle sipes 21 which traverses the second middle land portion 14 completely in the tire axial direction. The second shoulder land portion 12 is provided with a plurality of second shoulder sipes 22 which extends from the second shoulder circumferential groove 6 to the second tread edge T2 at least.

In the present embodiment, a pitch length P4 in the tire circumferential direction of the plurality of second shoulder sipes 22 is preferably smaller than a pitch length P3 in the tire circumferential direction of the plurality of second middle sipes 21. Such an arrangement of sipes can improve wet performance and noise performance further due to the above-mentioned mechanism.

In the present embodiment, a pitch length P4 of two adjacent second shoulder sipes 22 arbitrarily selected from the plurality of second shoulder sipes 22 is smaller than a pitch length P3 of two adjacent second middle sipes 21 which are adjacent to the two adjacent second shoulder sipes 22 in the tire axial direction. In some preferred embodiments, an average of the pitch lengths P4 of the second shoulder sipes 22 is smaller than an average of the pitch lengths P3 of the second middle sipes 21. The arrangement of such sipes can improve noise performance more reliably.

In view of an improvement of wet performance and noise performance in a well-balanced manner, a pitch length P4 of two adjacent second shoulder sipes 22, for example, is in a range of from 70% to 95% of the pitch length P3 of two adjacent second middle sipes 21, preferably in a range of from 80% to 90%.

Preferably, the inner ends 22i of the second shoulder sipes 22 are provided at different positions in the tire circumferential from the respective outer ends 21o of the second middle sipes 21. Distances in the tire circumferential direction between the inner ends 22i of the second shoulder sipes 22 and the outer ends 21o of the second middle sipes 21, for example, are in a range of from 1.0 to 3.0 mm, more preferably in a range of from 1.5 to 2.5 mm. This feature can prevent pitch noise of each sipe from overlapping.

The second middle sipes 21, for example, are inclined in the second direction (up toward the right, in this embodiment) opposite to the first direction with respect to the tire axial direction. An angle of the second middle sipes 21, for example, is in a range of from 20 to 40 degrees with respect to the tire axial direction. Such second middle sipes 21 can also provide frictional force in the tire axial direction during wet driving.

The second middle sipes 21, for example, are configured as chamfered sipes as shown in FIG. 3. A chamfer portion 35 of each second middle sipe 21, for example, includes a constant width portion 35a, an inner widening portion 35b located on the second crown circumferential groove 8 side of the constant width portion 35a, and an outer widening portion 35c located on the second shoulder circumferential groove 6 side of the constant width portion 35a. The configurations of the constant width portion 25a, the inner widening portion 25b and the outer widening portion 25c (shown in FIG. 4) of the chamfered portion 25 of the first middle sipes 16 described above are applicable to these portions 35a, 35b and 35c, respectively. Thus, the detailed explanation here is omitted.

In addition, the above-mentioned cross section of the first middle sipes 16 (shown in FIG. 5) can be applied to the cross section along the sipe-length direction of each second middle sipe 21.

In some preferred embodiments, the maximum depth of the second middle sipes 21 is smaller than the maximum depth of the second shoulder sipes 22. As a result, the rigidity of the second middle land portion 14 can be maintained, so that the steering stability can be improved and the rolling resistance can be reduced.

The configuration of the first shoulder sipes 17 described above can be applied to the second shoulder sipes 22, and the detailed explanation here is omitted.

In the present embodiment, the second shoulder land portion 12 is further provided with a plurality of second semi-open sipes 23. The second semi-open sipes 23, for example, are configured as non-chamfered sipes as shown in FIG. 2. The second semi-open sipes 23 extend from the second shoulder circumferential groove 6 and terminate within the second shoulder land portion 12 without reaching the second tread edge T2. In the present embodiment, the second shoulder sipes 22 and the second semi-open sipes 23 are arranged alternately in the tire circumferential direction. Such second semi-open sipes 23 can help to improve wet performance and noise performance.

The second semi-open sipes 23, for example, are inclined in the first direction with respect to the tire axial direction. An angle difference between the second semi-open sipes 23 and the second shoulder sipes 22, for example, are equal to or less than 5 degrees. In addition, a length L7 in the tire axial direction of the second semi-open sipes 23, for example, is in a range of from 80% to 95% of a width W6 in the tire axial direction of the ground contact surface of the second shoulder land portion 12. Such second semi-open sipes 23 can improve wet performance while suppressing uneven wear around the second tread edge T2.

Figure 9:
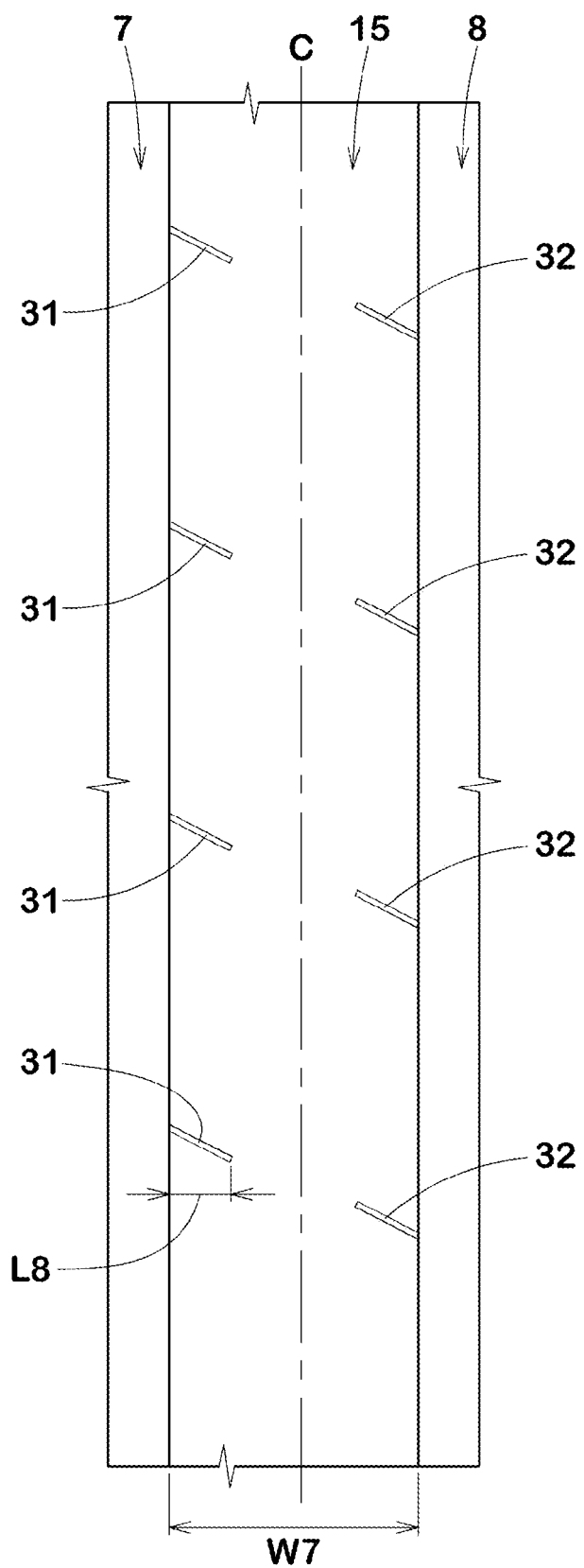
FIG. 9 is an enlarged view of a crown land portion.

FIG. 9 illustrates an enlarged view of the crown land portion 15. As illustrated in FIG. 9, the crown land portion 15 is provided with a plurality of first crown sipes 31 and a plurality of second crown sipes 32. The first crown sipes 31 and the second crown sipes 32, for example, are configured as non-chamfered sipes as shown in FIG. 2. The first crown sipes 31, for example, extend from the first crown circumferential groove 7 and terminate within the crown land portion 15. The second crown sipes 32, for example, extend from the second crown circumferential groove 8 and terminate within the crown land portion 15. Such first crown sipes 31 and such second crown sipes 32 can help to reduce rolling resistance of the tire and can improve noise performance.

In order to ensure the above-mentioned effects, the first crown sipes 31 and the second crown sipes 32 do not cross the center position in the tire axial direction of the crown land portion 15 and do not cross the tire equator C. A length L8 in the tire axial direction of the first crown sipes 31 and the second crown sipes 32, for example, is in a range of from 15% to 30% of a width W7 in the tire axial direction of the ground contact surface of the crown land portion 15.

The first crown sipes 31 and the second crown sipes 32, for example, are inclined in the first direction with respect to the tire axial direction. An angle of the first crown sipes 31 and an angle of the second crown sipes 32, for example, are in a range of from 20 to 40 degrees with respect to the tire axial direction. With this, uneven wear of the crown land portion 15 can be suppressed.

In the present embodiment, no sipes are provided in addition to the above-mentioned sipes in the land portions. This allows the above-mentioned various performances to be exhibited in a well-balanced manner. However, the present disclosure is not limited to such an embodiment.

Hereinafter, other embodiments of the present disclosure will be described. In the following, the same reference numerals are given to the elements common to the above-described embodiments, and the above-mentioned configurations are applied thereto.

Figure 10:
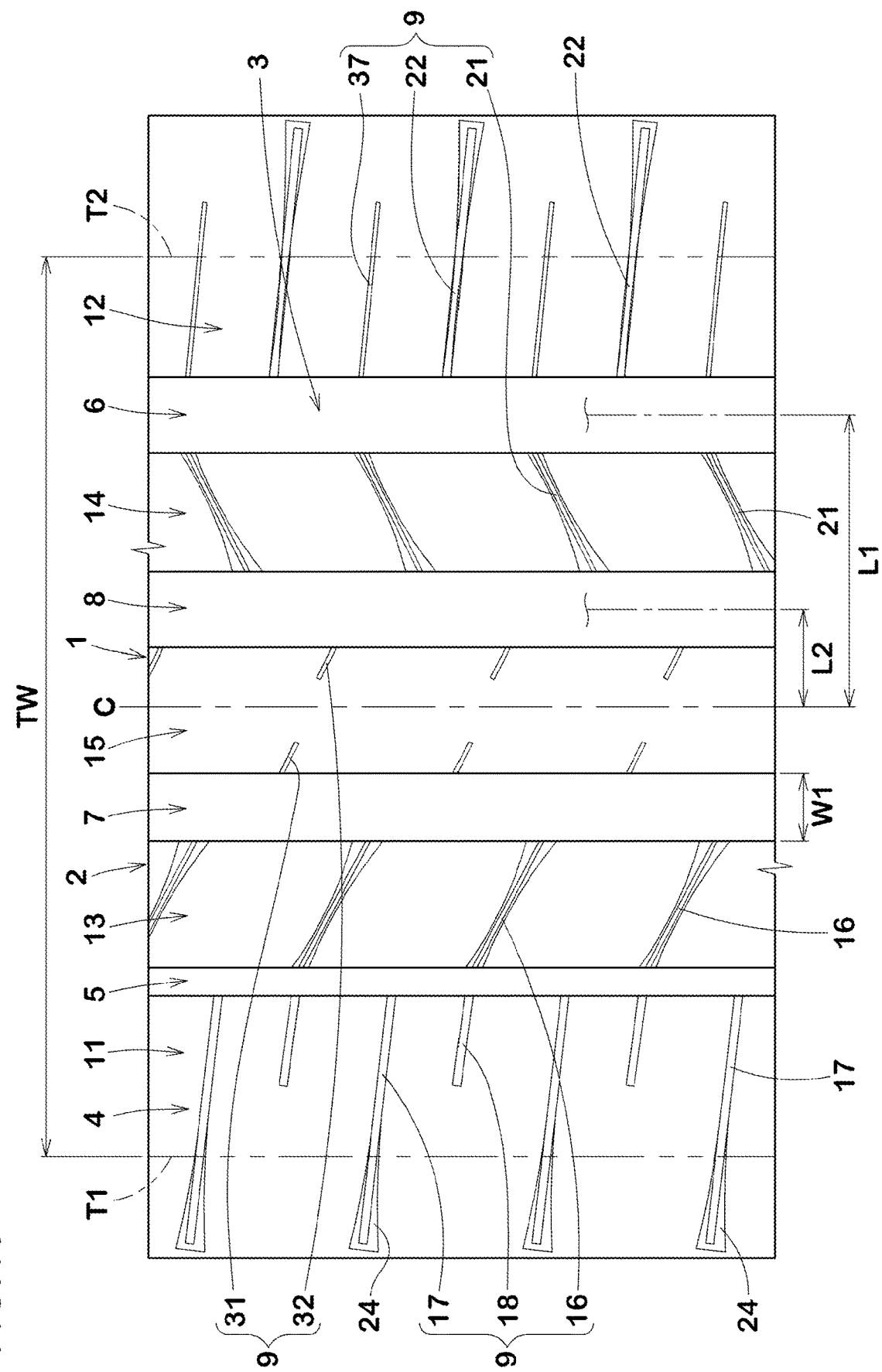
FIG. 10 is a development view of the tread portion in accordance with another embodiment of the present disclosure.
Figure 11:
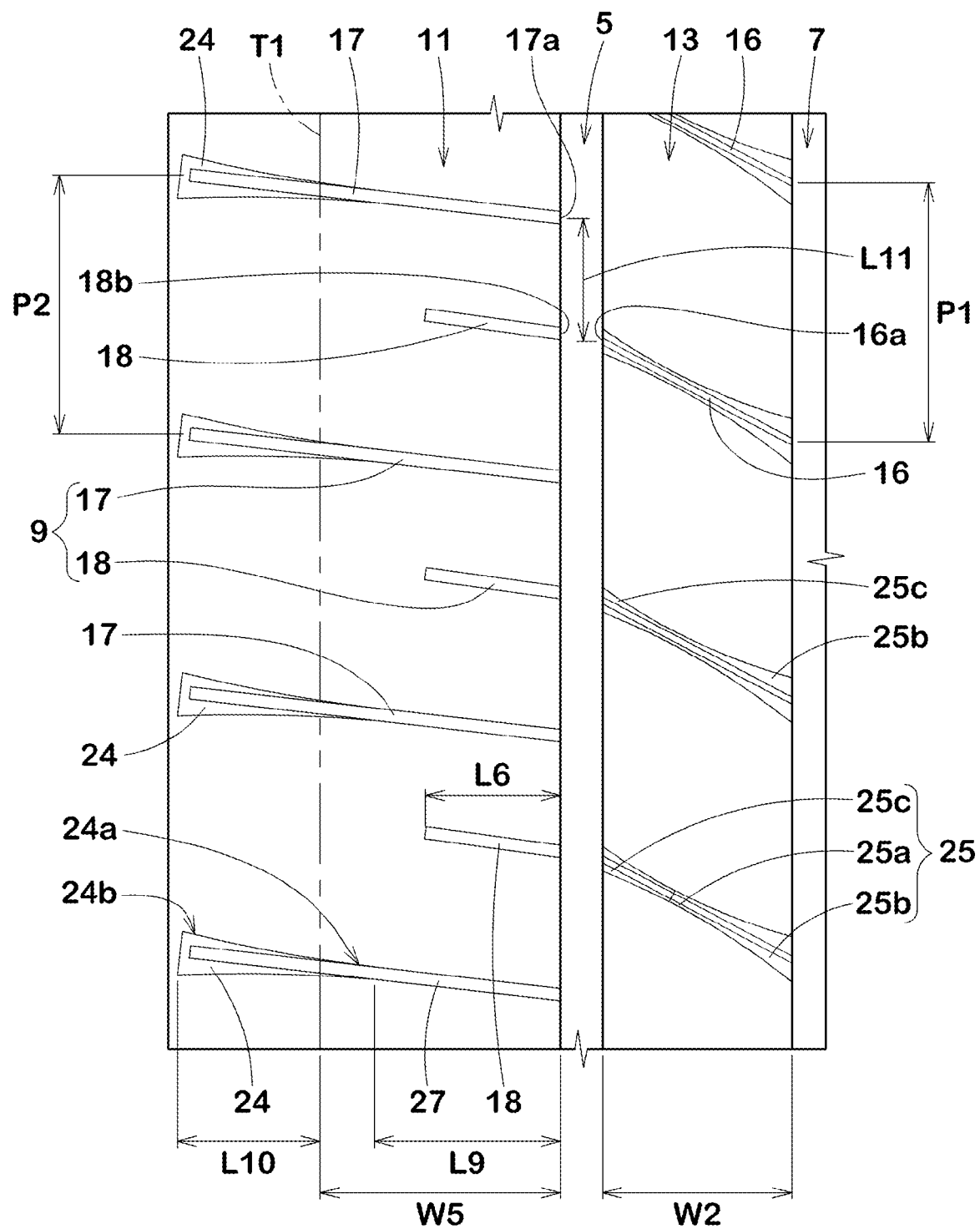
FIG. 11 is an enlarged view of the first shoulder land portion and the first middle land portion of FIG. 10.

FIG. 10 illustrates a development view of the tread portion 2 in accordance with another embodiment. FIG. 11 illustrates an enlarged view of the first shoulder land portion 11 and the first middle land portion 13. As illustrated in FIG. 11, in this embodiment, the first shoulder land portion 11 is provided with a plurality of first shoulder sipes 17 extending from the first shoulder circumferential groove 5 to a location beyond the first tread edge T1.

Figure 12:
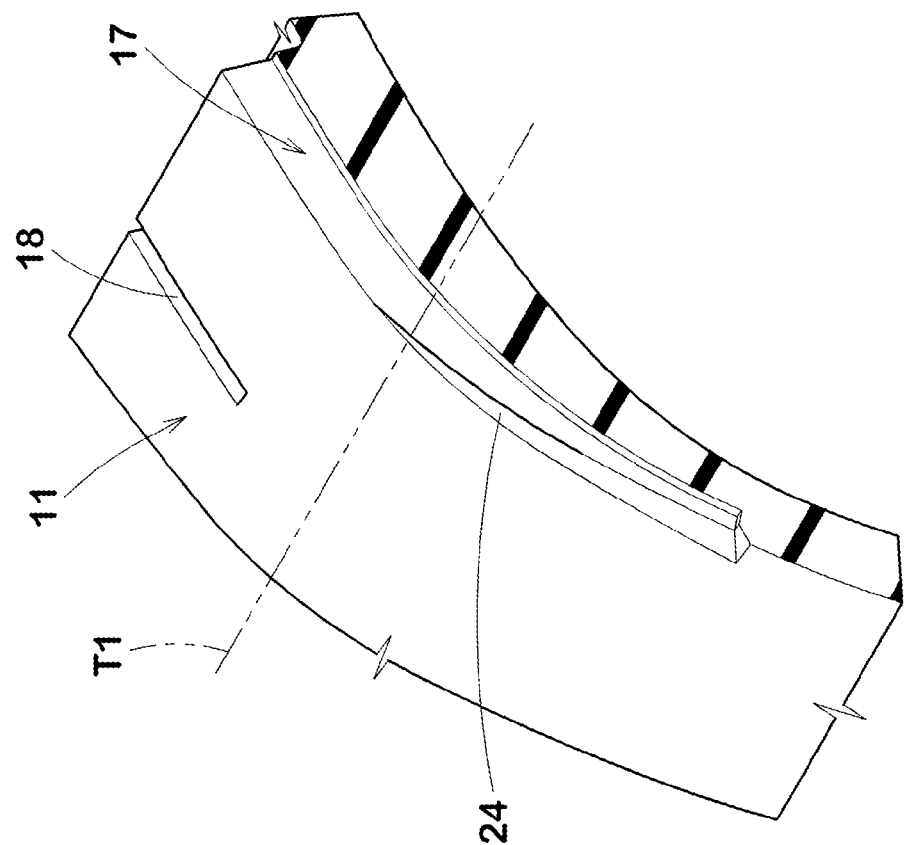
FIG. 12 is an enlarged perspective view of a first shoulder sipe of FIG. 11.

FIG. 12 illustrates an enlarged perspective view of the first shoulder sipe 17 cut at its sipe centerline. As illustrated in FIG. 11 and FIG. 12, each first shoulder sipe 17 includes a pair of sipe edges, and at least one or both of the pair of sipe edges have a chamfer portion 24. In this embodiment, both of the pair of sipe edges have the chamfer portion 24. The chamfer portion 24 of each first shoulder sipe 17, in a tread plan view, has a chamfer width increasing outwardly in the tire axial direction. In this embodiment, due to the above configuration, noise performance and wet performance of the tire can be improved. The reason is inferred as follows.

In this embodiment, since the first shoulder land portion 11 is provided with the plurality of first shoulder sipes 17, impact noise when the first shoulder land portion 11 comes into contact with the ground can be reduced. Further, the pitch noise generated by the first shoulder sipes 17 can be small, which contributes to improved noise performance. Furthermore, since the adjacent block pieces in the tire circumferential direction via a respective one of the first shoulder sipes 17 are easy to contact with each other, they are hard to vibrate after they leave the ground. Thus, the noise caused by the vibration of these block pieces can be suppressed.

In this embodiment, the chamfer portion 24 of each first shoulder sipe 17 has a chamfer width increasing outwardly in the tire axial direction. Thus, when the first shoulder sipes 17 come into contact with wet road surfaces, the chamfered portions 24 can push the water film outwardly in the tire axial direction, and can exhibit excellent drainage.

As illustrated in FIG. 11, a pitch length P2 in the tire circumferential direction of the first shoulder sipes 17, for example, is in a range of from 90% to 120% of the width W5 in the tire axial direction of the ground contact surface of the first shoulder land portion 11.

The first shoulder sipes 17 each are configured as a mixed sipe that includes a cross-sectional shape shown in FIG. 2 and a cross-sectional shape shown in FIG. 3. That is, each first shoulder sipe 17 partially includes a region 27 (hereinafter, referred to as "non-chamfered region 27") that is configured as non-chamfer sipe. In the present embodiment, the non-chamfered region 27 of each first shoulder sipe 17 is connected to the first shoulder circumferential groove 5.

As illustrated in FIG. 11, a length L9 in the tire axial direction of the non-chamfered region 27 of each first shoulder sipe 17, for example, is in a range of from 70% to 90% of the width W5 in the tire axial direction of the ground contact surface of the first shoulder land portion 11. With this, the reduction in the ground contact surface of the first shoulder land portion 11 due to the chamfer portions 24 of the first shoulder sipes 17 can be minimized, and excellent noise performance can be obtained.

The chamfer portion 24 of each first shoulder sipe 17 has a chamfer width increasing continuously from the non-chamfered region 27 to an outer end in the tire axial direction of the first shoulder sipe 17. In each chamfer portion 24, a minimum chamfer-width portion 24a having the minimum chamfer width is located inwardly in the tire axial direction with respect to the first tread edge T1. On the other hand, in each chamfer portion 24, a maximum chamfer-width portion 24b having the maximum chamfer width is located outwardly in the tire axial direction with respect to the first tread edge T1. This feature can help to improve wet performance and reduce impact noise when the edges of the first shoulder sipes 17 come into contact with the ground around the first tread edge T1.

A length L10 in the tire axial direction from the first tread edge T1 to the outer ends of first shoulder sipes 17, for example, is in a range of from 50% to 65% of the width W5 in the tire axial direction of the ground contact surface of the first shoulder land portion 11. This can improve wet performance and noise performance in a well-balanced manner.

A chamfer width of the maximum chamfer-width portion 24b, for example, is in a range of from 1.5 to 3.0 mm, preferably from 2.0 to 2.5 mm. A chamfer depth of the maximum chamfer-width portion 24b, for example, is in a range of from 0.5 to 3.0 mm, preferably from 2.0 to 2.5 mm. Further, the chamfer width and the chamfer depth of each chamfer portion 24 at the first tread edge T1, for example, are in a range of from 0.3 to 1.0 mm, preferably from 0.4 to 0.6 mm. Such a chamfer portion 24 can improve noise performance and wet performance in a well-balanced manner.

In the same point of view, the chamfer width of each chamfer portion 24 at the first tread edge T1 is preferably in a range of from 10% to 25%, more preferably from 15% to 20%, of the maximum chamfer width of the maximum chamfer-width portion 24b. Further, a chamfer depth of each chamfer portion 24 at the first tread edge T1 is preferably in a range of from 10% to 25%, more preferably from 15% to 20%, of the maximum chamfer depth of the maximum chamfer-width portion 24b.

An angle of the first shoulder sipes 17, for example, is equal to or less than 10 degrees with respect to the tire axial direction. In the present embodiment, the first shoulder sipes 17 are inclined in the first direction with respect to the tire axial direction. In some preferred embodiments, the above-mentioned angle of the first shoulder sipes 17, for example, is in a range of from 3 to 10 degrees.

In the present embodiment, the first shoulder land portion 11 is further provided with a plurality of first semi-open sipes 18. The first semi-open sipes 18 extend from the first shoulder circumferential groove 5 and terminate within the first shoulder land portion 11 without reaching the first tread edge T1. The first shoulder sipes 17 and the first semi-open sipes 18 are arranged alternately in the tire circumferential direction. Such first semi-open sipes 18 can improve wet performance while maintaining the rigidity of the first shoulder land portion 11.

A length L6 in the tire axial direction of the first semi-open sipes 18, for example, is in a range of from 40% to 70%, preferably from 50% to 60%, of the width W5 in the tire axial direction of the ground contact surface of the first shoulder land portion 11. Such first semi-open sipes 18 can improve steering stability and wet performance in a well-balanced manner.

The first semi-open sipes 18, for example, are inclined in the first direction with respect to the tire axial direction. An angle of the first semi-open sipes 18, for example, is in a range of from 3 to 10 degrees with respect to the tire axial direction. In this embodiment, an angle difference between the first shoulder sipes 17 and the first semi-open sipes 18 is equal to or less than 10 degrees, more preferably zero (i.e., parallel with each other). Such an arrangement of the sipes can suppress uneven wear of the first shoulder land portion 11.

In this embodiment, a pitch length P1 in the tire circumferential direction of the first middle sipes 16, for example, is in a range of from 100% to 150% of the width W2 in the tire axial direction of the ground contact surface of the first middle land portion 13.

In this embodiment, the maximum angle of the first middle sipes 16, for example, is in a range of from 15 to 45 degrees, more preferably from 25 to 35 degrees, with respect to the tire axial direction. Preferably, the maximum angle with respect to the tire axial direction of the first middle sipes 16 is greater than the maximum angle with respect to the tire axial direction of the first shoulder sipes 17. Such first middle sipes 16 can also exert frictional force in the tire axial direction, which can help to improve cornering performance on wet road surfaces.

Distances L11 in the tire circumferential direction between the ends 16a of the respective first middle sipes 16 on the first shoulder circumferential groove 5 side and the ends 17a of the respective first shoulder sipes 17 on the first shoulder circumferential groove 5 side, for example, are in a range of from 10% to 50%, preferably from 30% to 50%, of a pitch length P1 in the tire circumferential direction of the first middle sipes 16. This feature can help to improve steering stability and noise performance in a well-balanced manner.

Further, distances in the tire circumferential direction between the ends 16a of the respective first middle sipes 16 and the ends 18b of the respective first semi-open sipes 18 on the first shoulder circumferential groove 5 side, for example, are equal to or less than 20%, preferably equal to or less than 10%, of a pitch length P1 in the tire circumferential direction of the first middle sipes 16. In this embodiment, these distances are set to zero. In other words, the respective ends 16a face the respective ends 18b.

Figure 13:
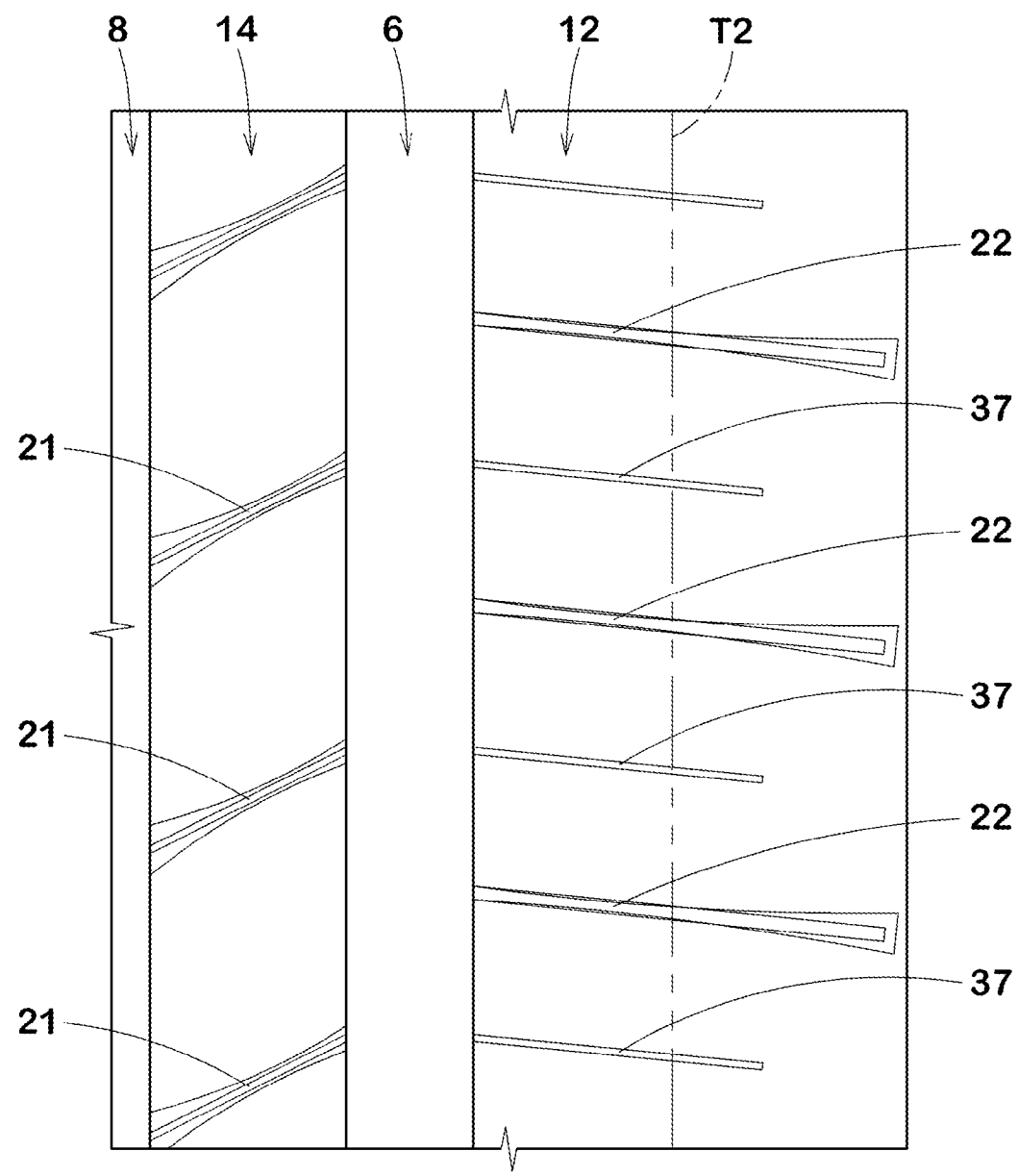
FIG. 13 is an enlarged view of the second shoulder land portion and the second middle land portion of FIG. 10.

FIG. 13 illustrates an enlarged view of the second shoulder land portion 12 and the second middle land portion 14 of FIG. 10. As illustrated in FIG. 13, the second shoulder land portion 12 is provided with a plurality of second shoulder sipes 22. In this embodiment, the configuration of the first shoulder sipes 17 described above can be applied to the second shoulder sipes 22, and the detailed explanation here is omitted.

Preferably, the second shoulder land portion 12 is further provided with a plurality of narrow-width sipes 37. The narrow-width sipes 37 each has a width smaller than a sipe width of the second shoulder sipes 22. The narrow-width sipes 37 extend from the second shoulder circumferential groove 6 to a location beyond the second tread edge T2. However, a length in the tire axial direction of the narrow-width sipes 37 is smaller than a length in the tire axial direction of the second shoulder sipes 22. Further, the narrow-width sipes 37 are configured as non-chamfer sipes. Thus, the noise when the second shoulder sipes 22 and the narrow-width sipes 37 come into contact with the ground is likely to become white noise, and noise performance and wet performance can be improved in a well-balanced manner.

The narrow-width sipes 37, for example, are inclined in the first direction with respect to the tire axial direction. An angle of the narrow-width sipes 37, for example, is in a range of from 3 to 10 degrees with respect to the tire axial direction. In the present embodiment, an angle difference between the second shoulder sipes 22 and the narrow-width sipes 37 is equal to or less than 10 degrees, more preferably zero (i.e., parallel with each other). Such an arrangement of sipes can help to improve uneven wear of the second shoulder land portion 12.

In this embodiment, the land portions are not provided with sipes other than the above-mentioned sipes. Thereby, the various performances described above can be exhibited in a well-balanced manner. Note that the present disclosure is not limited to such an embodiment.

Figure 14:
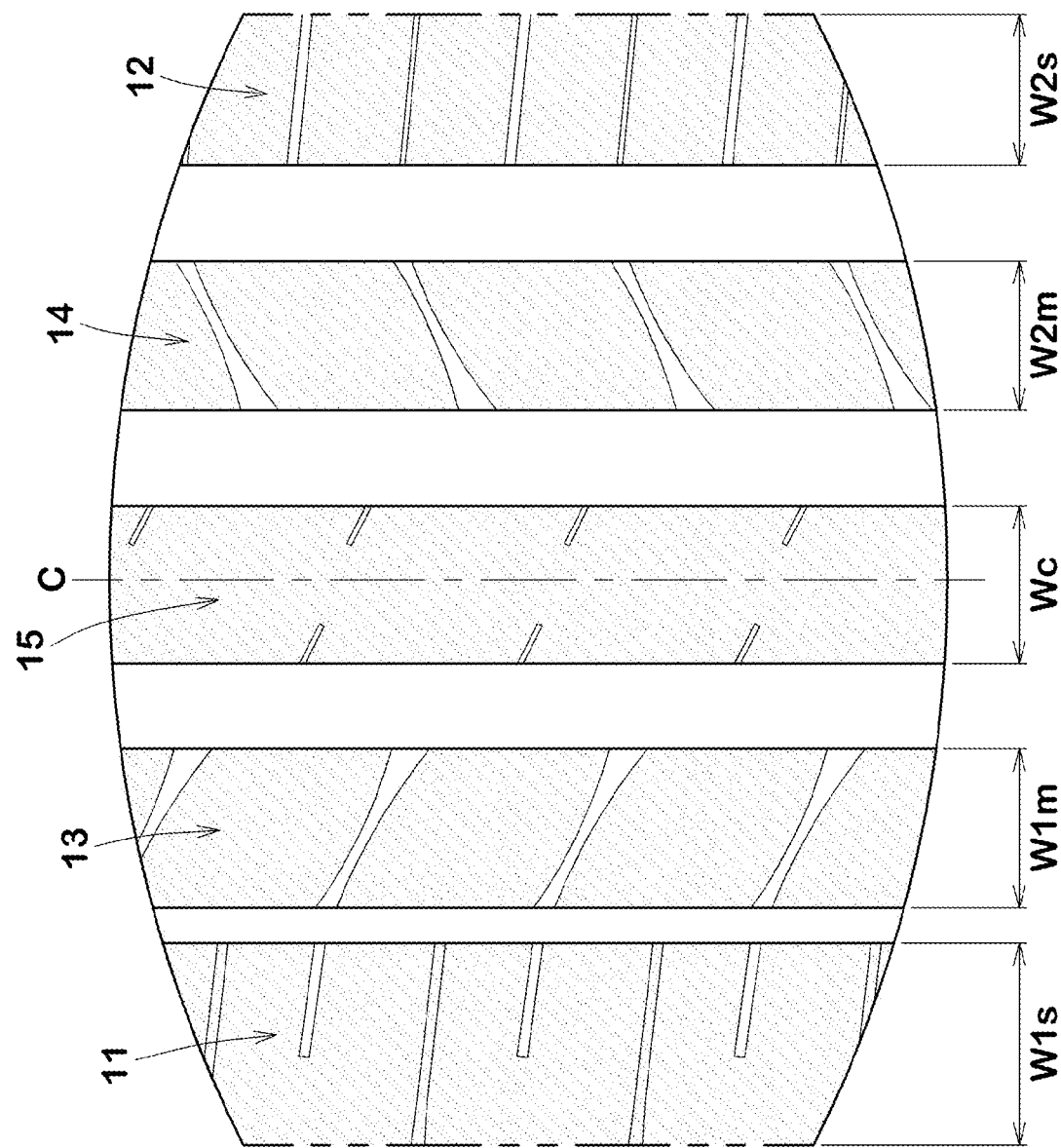
FIG. 14 is an enlarged view of a ground contact patch of the tread portion shown in FIG. 10.

FIG. 14 illustrates an enlarged view of a ground contact patch of the tread portion 2 according to this embodiment. As illustrated in FIG. 14, the contact patch is a contact patch in a 50% loaded state in which a 50% of the standard tire load is applied to the tire 1 in the normal state and the tire 1 is in contact with a flat surface at zero camber angles. In the contact patch, the ground contact surfaces of the first shoulder land portion 11, the first middle land portion 13, the crown land portion 15, the second middle land portion 14 and the second shoulder land portion 12 have widths W1s, W1m, Wc, W2m and W2s, respectively, in the tire axial direction, and the width W1s is preferably greater than the widths W1m, Wc, W2m and W2s. Preferably, the width W1s is in a range of from 115% to 130% of the width Wc of the crown land portion 15. As a result, the first shoulder land portion 11 can have high rigidity, and excellent steering stability can be exerted.

In this embodiment, the widths W1m, Wc, W2m and W2s are close to each other. Preferably, the widths W1m, W2m and W2s are in a range of from 90% to 110% of the width Wc of the crown land portion 15. As a result, uneven wear of each land portion can be suppressed.

While the particularly preferable embodiments of the tire in accordance with the present disclosure have been described in detail, the present disclosure is not limited to the illustrated embodiments, but can be modified and carried out in various aspects within the scope of the disclosure.

EXAMPLE

Pneumatic tires with the size 235/55R19 and the basic tread pattern of FIG. 1 were prepared based on the specifications in Table 1. A pitch length P1 of the first middle sipes is common among the tires of each embodiment. Similarly, a pitch length P3 of the second middle sipes is common among the tires of each embodiment.

As a comparative example, other tires were also prepared. These tires have a pitch length P2 of the first shoulder sipes being same as a pitch length P1 of the first middle sipes and a pitch length P4 of the second shoulder sipes being same as a pitch length P3 of the second middle sipes. The tires in the comparative example have substantially the same tread pattern as that shown in FIG. 1 except for the above features. Note that the pitch length P1 of the first middle sipes and the pitch length P2 of the second middle sipes in the comparative example are common to each example.

Further, standard tires (the first standard tire) were also prepared as a reference for comparing noise performance. In each first standard tire, the land portions of the tread portion have the widths same as those shown in FIG. 1 and the land portions are not provided with any grooves nor sipes.

Then, wet performance and noise performance of each test tire were tested. The common specifications and test methods for each test tire are as follows.

Rim size: 19×7.5J
Tire inner pressure: front 230 kPa/rear 210 kPa
Test vehicle: Displacement 2000 cc, four-wheel drive vehicle
Test tire location: all wheels Wet Performance Test:

The wet performance when driving on a wet road surface with the above test vehicle was evaluated by the driver's sensuality. The test results are shown in Table 1 using a score where the wet performance of the comparative example is set to 100. The larger the value, the better the wet performance.

Noise Performance Test:

The above test vehicle was made to run on a dry road surface at 70 km/h, and the maximum sound pressure of noise outside the vehicle was measured. The test results are shown in Table 1 using an index of the reduction of sound pressure from the sound pressure of the first standard tire. In Table 1, the reduction of sound pressure of the comparative example is set to 100. The larger the index, the smaller the maximum sound pressure of the noise, which means the better noise performance.

Table 1 shows the test results.

TABLE 1

|  | Comparative example | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| Pitch length P2 of first shoulder sipes/ pitch length P1 of first middle sipes (%) | 100 | 85 | 75 | 80 | 90 | 95 | 85 | 85 | 85 | 85 |
| Pitch length P4 of second shoulder sipes/ pitch length P3 of second middle sipes (%) | 100 | 85 | 85 | 85 | 85 | 85 | 75 | 80 | 90 | 95 |
| Wet performance (score) | 100 | 102 | 103 | 102 | 101 | 100 | 103 | 103 | 102 | 101 |
| Noise performance (index) | 100 | 108 | 108 | 108 | 106 | 104 | 108 | 108 | 107 | 106 |

As a result of the test, it was confirmed that the tires of examples improved noise performance while ensuring excellent wet performance.

Pneumatic tires with the size 235/45R19 and the basic tread pattern of FIG. 10 were prepared based on the specifications in Table 2. In addition, as a reference example, as illustrated in FIG. 15, tires in which each shoulder sipe (a) was configured as a non-chamfered sipe were also prepared.

Further, standard tires (the second standard tire) were also prepared as a reference for comparing noise performance. In each second standard tire, the land portions of the tread portion have the widths same as those shown in FIG. 10 and the land portions are not provided with any grooves nor sipes. For each test tire, the noise performance and wet performance described above were tested. In Table 2 below, noise performance is indicated the reduction in sound pressure with respect to the second standard tire using an index where the reference example is set to 100. Wet performance is shown using a score where the reference example performance is set to 100.

Table 2 shows the test results.

TABLE 2

|  | Reference example | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|---|
| Figure showing tread pattern | FIG. 15 | FIG. 10 | FIG. 10 | FIG. 10 | FIG. 10 | FIG. 10 | FIG. 10 | FIG. 10 | FIG. 10 | FIG. 10 |
| Length L3 of non-chamfered region of first shoulder sipes/width W4 of ground contact surface of first shoulder land portion (%) | — | 80 | 70 | 75 | 85 | 90 | 80 | 80 | 80 | 80 |
| Chamfer width of maximum chamfer-width portion (mm) | — | 2.4 | 2.4 | 2.4 | 2.4 | 2.4 | 1.5 | 2.0 | 2.5 | 3.0 |
| Noise performance (index) | 100 | 117 | 111 | 115 | 117 | 118 | 118 | 117 | 117 | 115 |
| Wet performance (score) | 100 | 108 | 109 | 108 | 107 | 106 | 104 | 106 | 108 | 109 |

As a result of the test, it was confirmed that the tires of examples improved noise performance and wet performance.

Additional Notes

The present disclosure includes the following aspects.

Note 1

A tire comprising:
a tread portion comprising a first tread edge, a second tread edge, three or more circumferential grooves extending continuously in a tire circumferential direction between the first and second tread edges, and four or more land portions divided by the circumferential grooves,
the circumferential grooves comprising a first shoulder circumferential groove located nearest to the first tread edge in the circumferential grooves,
each of the land portions being provided with only sipes and being not provided with lateral grooves,
the land portions comprising a first shoulder land portion having the first tread edge, and a first middle land portion adjacent to the first shoulder land portion via the first shoulder circumferential groove,
the first middle land portion being provided with a plurality of first middle sipes traversing the first middle land portion completely in a tire axial direction,
the first shoulder land portion being provided with a plurality of first shoulder sipes extending from the first shoulder circumferential groove to the first tread edge, and
the plurality of first shoulder sipes having a pitch length in the tire circumferential direction smaller than a pitch length in the tire circumferential direction of the plurality of first middle sipes.

Note 2

The tire according to note 1, wherein
the plurality of first shoulder sipes has a depth decreasing from a first shoulder circumferential groove side to a first tread edge side.

Note 3

The tire according to note 1 or 2, wherein
the first shoulder land portion is provided with a plurality of first semi-open sipes extending from the first shoulder circumferential groove and terminating within the first shoulder land portion without reaching the first tread edge.

Note 4

The tire according to note 3, wherein
the plurality of first shoulder sipes extends axially outwardly from the first shoulder circumferential groove to a location beyond the first tread edge,
each of the plurality of first shoulder sipes has a pair of sipe edges, at least one of the pair of sipe edges having a chamfer portion, and
the chamfer portion, in a tread plan view, has a chamfer width increasing outwardly in the tire axial direction.

Note 5

The tire according to note 4, wherein
the chamfer portion has a minimum chamfer-width portion having a minimum chamfer width and a maximum chamfer-width portion having a maximum chamfer width, and
the minimum chamfer-width portion is located inwardly in the tire axial direction than the first tread edge, and the maximum chamfer-width portion is located outwardly in the tire axial direction than the first tread edge.

Note 6

The tire according to note 3, wherein
each of the plurality of first semi-open sipes has a pair of sipe edges, and
at least one of the pair of sipe edges has a chamfer portion.

Note 7

The tire according to note 6, wherein
the chamfer portion of each of the plurality of first semi-open sipes increases toward the first shoulder circumferential groove.

Note 8

The tire according to any one of notes 1 to 7, wherein
the circumferential grooves comprise a second shoulder circumferential groove arranged nearest to the second tread edge in the circumferential grooves,
the land portions comprise a second shoulder land portion having the second tread edge, and a second middle land portion adjacent to the second shoulder land portion via the second shoulder circumferential groove,
the second middle land portion is provided with a plurality of second middle sipes traversing the second middle land portion completely in the tire axial direction,
the second shoulder land portion is provided with a plurality of second shoulder sipes extending from the second shoulder circumferential groove to the second tread edge, and the plurality of second shoulder sipes has a pitch length in the tire circumferential direction smaller than a pitch length in the tire circumferential direction of the plurality of second middle sipes.

Note 9

The tire according to note 8, wherein
the plurality of second shoulder sipes comprises inner ends in the tire axial direction,
the plurality of second middle sipes comprises outer ends in the tire axial direction, and
the inner ends are provided at different positions in the tire circumferential direction from the respective outer ends.

Note 10

The tire according to note 8 or 9, wherein
the plurality of second middle sipes has a maximum depth smaller than a maximum depth of the plurality of second shoulder sipes.

Note 11

The tire according to any one of notes 8 to 10, wherein
the second shoulder land portion is provided with a plurality of second semi-open sipes extending from the second shoulder circumferential groove and terminating within the second shoulder land portion without reaching the second tread edge.

Note 12

The tire according to any one of notes 1 to 11, wherein
the tread portion has a designated mounting direction to a vehicle, and
the first tread edge is located outside a vehicle when the tire is mounted on the vehicle.

Note 13

The tire according to any one of notes 1 to 12, wherein
a total groove width of the circumferential grooves in a region between a tire equator and the first tread edge is smaller than a total groove width of the circumferential grooves in a region between the tire equator and the second tread edge.

Note 14

The tire according to note 1, wherein
the plurality of first shoulder sipes extends axially outwardly from the first shoulder circumferential groove to a location beyond the first tread edge,
each of the plurality of first shoulder sipes has a pair of sipe edges, at least one of the pair of sipe edges having a chamfer portion, and
the chamfer portion, in a tread plan view, has a chamfer width increasing outwardly in the tire axial direction.

Note 15

The tire according to note 14, wherein
the chamfer portion has a minimum chamfer-width portion having a minimum chamfer width and a maximum chamfer-width portion having a maximum chamfer width, and
the minimum chamfer-width portion is located inwardly in the tire axial direction than the first tread edge, and
the maximum chamfer-width portion is located outwardly in the tire axial direction than the first tread edge.

Note 16

The tire according to note 14 or 15, wherein
each of the plurality of first middle sipes comprises a pair of sipe edges, at least one of the pair of sipe edges having a chamfer portion,
the chamfer portion of each of the plurality of first middle sipes comprises
an inner widening portion where a chamfer width in a tread plan view increases inwardly in the tire axial direction, and
an outer widening portion located outwardly in the tire axial direction of the inner widening portion and a chamfer width thereof increasing outwardly in the tire axial direction.

Note 17

The tire according to note 16, wherein
a maximum chamfer width of the inner widening portion is greater than a maximum chamfer width of the outer widening portion.

Note 18

The tire according to any one of notes 14 to 17, wherein
the plurality of first shoulder sipes and the plurality of first middle sipes are inclined in a same direction with respect to the tire axial direction.

Note 19

The tire according to any one of notes 14 to 18, wherein
a maximum angle with respect to the tire axial direction of the plurality of first middle sipes is greater than a maximum angle with respect to the tire axial direction of the plurality of first shoulder sipes.

The invention claimed is:
1. A tire comprising:
a tread portion comprising a first tread edge, a second tread edge, three or more circumferential grooves extending continuously in a tire circumferential direction between the first and second tread edges, and four or more land portions divided by the circumferential grooves,
the circumferential grooves comprising a first shoulder circumferential groove located nearest to the first tread edge in the circumferential grooves,
each of the land portions being provided with only sipes and being not provided with lateral grooves,
the land portions comprising a first shoulder land portion having the first tread edge, and a first middle land portion adjacent to the first shoulder land portion via the first shoulder circumferential groove,
the first middle land portion being provided with a plurality of first middle sipes traversing the first middle land portion completely in a tire axial direction,
the first shoulder land portion being provided with a plurality of first shoulder sipes extending from the first shoulder circumferential groove to the first tread edge, the plurality of first shoulder sipes having a pitch length in the tire circumferential direction smaller than a pitch length in the tire circumferential direction of the plurality of first middle sipes, the plurality of first shoulder sipes having a depth decreasing continuously from the first shoulder circumferential groove to the first tread edge, each of the plurality of first middle sipes comprising a pair of sipe edges, at least one of the pair of sipe edges having a chamfer portion traversing the first middle land portion completely in the tire axial direction, and the chamfer portion of each of the plurality of first middle sipes comprising an inner widening portion where a chamfer width in a tread plan view increases inwardly in the tire axial direction, and an outer widening portion located outwardly in the tire axial direction of the inner widening portion where a chamfer width thereof increases outwardly in the tire axial direction, wherein a maximum chamfer width of the inner widening portion is greater than a maximum chamfer width of the outer widening portion, a maximum chamfer depth of the inner widening portion is greater than a maximum chamfer depth of the outer widening portion; and the maximum chamfer depth of the inner widening portion is in a range of from 1.5 to 2.5 times the maximum chamfer depth of the outer widening portion.

2. The tire according to claim 1, wherein
the first shoulder land portion is provided with a plurality of first semi-open sipes extending from the first shoulder circumferential groove and terminating within the first shoulder land portion without reaching the first tread edge.

3. The tire according to claim 2, wherein
the plurality of first shoulder sipes extends axially outwardly from the first shoulder circumferential groove to a location beyond the first tread edge, each of the plurality of first shoulder sipes has a pair of sipe edges, at least one of the pair of sipe edges having a chamfer portion, and the chamfer portion, in a tread plan view, has a chamfer width increasing outwardly in the tire axial direction.

4. The tire according to claim 3, wherein
the chamfer portion of each of the plurality of first shoulder sipes has a minimum chamfer-width portion having a minimum chamfer width and a maximum chamfer-width portion having a maximum chamfer width, and the minimum chamfer-width portion is located inwardly in the tire axial direction than the first tread edge, and the maximum chamfer-width portion is located outwardly in the tire axial direction than the first tread edge.

5. The tire according to claim 2, wherein
each of the plurality of first semi-open sipes has a pair of sipe edges, and at least one of the pair of sipe edges has a chamfer portion.

6. The tire according to claim 5, wherein
the chamfer portion of each of the plurality of first semi-open sipes increases toward the first shoulder circumferential groove.

7. The tire according to claim 1, wherein
the circumferential grooves comprise a second shoulder circumferential groove arranged nearest to the second tread edge in the circumferential grooves, the land portions comprise a second shoulder land portion having the second tread edge, and a second middle land portion adjacent to the second shoulder land portion via the second shoulder circumferential groove, the second middle land portion is provided with a plurality of second middle sipes traversing the second middle land portion completely in the tire axial direction, the second shoulder land portion is provided with a plurality of second shoulder sipes extending from the second shoulder circumferential groove to the second tread edge, and the plurality of second shoulder sipes has a pitch length in the tire circumferential direction smaller than a pitch length in the tire circumferential direction of the plurality of second middle sipes.

8. The tire according to claim 7, wherein
the plurality of second shoulder sipes comprises inner ends in the tire axial direction, the plurality of second middle sipes comprises outer ends in the tire axial direction, and the inner ends are provided at different positions in the tire circumferential direction from the respective outer ends.

9. The tire according to claim 7, wherein
the plurality of second middle sipes has a maximum depth smaller than a maximum depth of the plurality of second shoulder sipes.

10. The tire according to claim 7, wherein
the second shoulder land portion is provided with a plurality of second semi-open sipes extending from the second shoulder circumferential groove and terminating within the second shoulder land portion without reaching the second tread edge.

11. The tire according to claim 1, wherein
the tread portion has a designated mounting direction to a vehicle, and the first tread edge is located outside a vehicle when the tire is mounted on the vehicle.

12. The tire according to claim 1, wherein
a total groove width of the circumferential grooves in a region between a tire equator and the first tread edge is smaller than a total groove width of the circumferential grooves in a region between the tire equator and the second tread edge.

13. The tire according to claim 1, wherein
the plurality of first shoulder sipes extends axially outwardly from the first shoulder circumferential groove to a location beyond the first tread edge, each of the plurality of first shoulder sipes has a pair of sipe edges, at least one of the pair of sipe edges having a chamfer portion, and the chamfer portion, in a tread plan view, has a chamfer width increasing outwardly in the tire axial direction.

14. The tire according to claim 13, wherein
the chamfer portion of each of the plurality of first shoulder sipes has a minimum chamfer-width portion having a minimum chamfer width and a maximum chamfer-width portion having a maximum chamfer width, and the minimum chamfer-width portion is located inwardly in the tire axial direction than the first tread edge, and the maximum chamfer-width portion is located outwardly in the tire axial direction than the first tread edge.

15. The tire according to claim 13, wherein
the plurality of first shoulder sipes and the plurality of first middle sipes are inclined in a same direction with respect to the tire axial direction.

16. The tire according to claim 13, wherein
a maximum angle with respect to the tire axial direction of the plurality of first middle sipes is greater than a maximum angle with respect to the tire axial direction of the plurality of first shoulder sipes.

17. A tire comprising:
a tread portion comprising a first tread edge, a second tread edge, three or more circumferential grooves extending continuously in a tire circumferential direction between the first and second tread edges, and four or more land portions divided by the circumferential grooves,
the circumferential grooves comprising a first shoulder circumferential groove located nearest to the first tread edge in the circumferential grooves,
each of the land portions being provided with only sipes and being not provided with lateral grooves,
the land portions comprising a first shoulder land portion having the first tread edge, and a first middle land portion adjacent to the first shoulder land portion via the first shoulder circumferential groove,
the first middle land portion being provided with a plurality of first middle sipes traversing the first middle land portion completely in a tire axial direction,
the first shoulder land portion being provided with a plurality of first shoulder sipes extending from the first shoulder circumferential groove to the first tread edge,
the plurality of first shoulder sipes having a pitch length in the tire circumferential direction smaller than a pitch length in the tire circumferential direction of the plurality of first middle sipes,
the first shoulder land portion having a plurality of first semi-open sipes extending from the first shoulder circumferential groove and terminating within the first shoulder land portion without reaching the first tread edge,
the first semi open sipes each including a terminal end and an opposite end connected to the first shoulder circumferential groove,
the first semi open sipes each having a chamfer portion having a width increasing continuously from the terminal end side toward the first shoulder circumferential groove,
each of the plurality of first middle sipes comprising a pair of sipe edges, at least one of the pair of sipe edges having a chamfer portion traversing the first middle land portion completely in the tire axial direction, and
the chamfer portion of each of the plurality of first middle sipes comprising an inner widening portion where a chamfer width in a tread plan view increases inwardly in the tire axial direction, and an outer widening portion located outwardly in the tire axial direction of the inner widening portion where a chamfer width thereof increases outwardly in the tire axial direction,
wherein
a maximum chamfer width of the inner widening portion is greater than a maximum chamfer width of the outer widening portion,
a maximum chamfer depth of the inner widening portion is greater than a maximum chamfer depth of the outer widening portion; and
the maximum chamfer depth of the inner widening portion is in a range of from 1.5 to 2.5 times the maximum chamfer depth of the outer widening portion.

18. The tire according to claim 1, wherein the chamfer portion of each of the plurality of first middle sipes comprises a constant width portion extending in a sipe-length direction with a constant chamfer width,
wherein the inner widening portion is connected to the constant width portion,
wherein the outer widening portion is connected to the constant width portion on the first shoulder circumferential groove side, and
wherein an axial center of the constant width portion is offset to a first tread edge side from the center in the tire axial direction of the first middle land portion.

19. The tire according to claim 1, wherein both of the pair of sipe edges of each of the plurality of first middle sipes has the chamfer portion.

20. The tire according to claim 1, wherein the land portions further comprise a crown land portion disposed on a tire equator, and
wherein the crown land portion is a continuously extending rib in the tire circumferential direction, the rib not having any sipes completely traversing the crown land portion in the tire axial direction.

* * * * *